US011242454B2

United States Patent
Kim et al.

(10) Patent No.: US 11,242,454 B2
(45) Date of Patent: Feb. 8, 2022

(54) COMPOSITION FOR HEAT-SHRINKABLE TUBE AND HEAT-SHRINKABLE TUBE MANUFACTURED THEREFROM

(71) Applicant: LS CABLE & SYSTEM LTD., Anyang-si (KR)

(72) Inventors: Yu Min Kim, Suwon-Si (KR); Min Gyu Kang, Anyang-Si (KR); Whan Ki Kim, Hwaseong-Si (KR); Sang Hee Kim, Bucheon-Si (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 0 days.

(21) Appl. No.: 16/771,508

(22) PCT Filed: Oct. 26, 2018

(86) PCT No.: PCT/KR2018/012811
§ 371 (c)(1),
(2) Date: Jun. 10, 2020

(87) PCT Pub. No.: WO2019/132213
PCT Pub. Date: Jul. 4, 2019

(65) Prior Publication Data
US 2020/0299494 A1 Sep. 24, 2020

(30) Foreign Application Priority Data
Dec. 29, 2017 (KR) .................. 10-2017-0184079

(51) Int. Cl.
*C08L 23/28* (2006.01)
*C08L 23/08* (2006.01)

(52) U.S. Cl.
CPC ......... *C08L 23/286* (2013.01); *C08L 23/0815* (2013.01); *C08L 2201/02* (2013.01);
(Continued)

(58) Field of Classification Search
CPC .............. C08L 23/286; C08L 23/0185; C08L 2207/04; C08L 2205/02; C08L 2205/03
See application file for complete search history.

(56) References Cited

U.S. PATENT DOCUMENTS 4,511,689 A * 4/1985 Aldred .................. C08L 23/286
524/484
5,473,007 A * 12/1995 Kwon .................. C08F 255/023
524/527

(Continued)

FOREIGN PATENT DOCUMENTS

JP  H0762159 A  3/1995
JP  H10168248 A  6/1998
(Continued)

OTHER PUBLICATIONS

English-language machine translation of KR20130094406, 18 pages, translation performed on Espacenet on Jul. 1, 2021.*
(Continued)

*Primary Examiner* — Nicholas E Hill
(74) *Attorney, Agent, or Firm* — K&L Gates LLP

(57) ABSTRACT

Provided is a composition for a heat-shrinkable tube, comprising: a base resin; and a flame retardant, wherein the base resin comprises chlorinated polyolefin resin and polyolefin elastomer, wherein the chlorinated polyolefin resin comprises chlorine in an amount of 30 to 40% by weight based on the total weight thereof, and the polyolefin elastomer has a melting point of 95 to 120° C., and an amount of the chlorinated polyolefin resin is 40 to 60 parts by weight and an amount of the polyolefin elastomer is 20 to 40 parts by weight, based on 100 parts by weight of the base resin.

9 Claims, 1 Drawing Sheet

(52) U.S. Cl.
CPC ....... *C08L 2205/02* (2013.01); *C08L 2205/03* (2013.01); *C08L 2207/04* (2013.01)

(56) References Cited

U.S. PATENT DOCUMENTS 9,524,812 B2 * 12/2016 Yamasaki ................. B32B 7/12
2016/0229931 A1 * 8/2016 Yoo ........................ C08K 5/14

FOREIGN PATENT DOCUMENTS

| JP | 2015089925 A | 5/2015 |
|----|--------------|--------|
| KR | 100674747 B1 | 1/2007 |
| KR | 20090105489 A | 10/2009 |
| KR | 20130094406 A | 8/2013 |
| KR | 101488784 B1 | 2/2015 |

OTHER PUBLICATIONS

REXPEARL EEA product information sheet, 2 pages, undated, accessed on Jul. 1, 2021, at https://www.pochem.co.jp/jpe/product/pdf/rexpearl_eea.pdf.*
English-language machine translation of KR100674747B1, performed on Espacenet on Dec. 30, 2021.*
International Search Report for related International Application No. PCT/KR2018/012811; report dated Jul. 4, 2019; (5 pages).
Written Opinion for related International Application No. PCT/KR2018/012811; report dated Jul. 4, 2019; (5 pages).
ASTM International; "Standard Test Methods for Rubber-Viscosity, Stress Relaxation, and Pre-Vulcanization Characteristics (Mooney Viscometer)"; Designation: D1646-04; Department of Defense; Feb. 2004; (12 pages).

* cited by examiner

COMPOSITION FOR HEAT-SHRINKABLE TUBE AND HEAT-SHRINKABLE TUBE MANUFACTURED THEREFROM

CROSS-REFERENCE TO RELATED APPLICATIONS

The present application is a National Stage of International Application No. PCT/KR2018/012811, filed Oct. 26, 2018, which claims priority to Korean Application No. 10-2017-0184079, filed Dec. 29, 2017, the disclosure of which are incorporated herein by reference.

FIELD OF THE INVENTION

The present invention relates to a composition for a heat-shrinkable tube and a heat-shrinkable tube manufactured therefrom. More specifically, the present invention relates to a composition, for a heat-shrinkable tube, having excellent mechanical properties, heat resistance, cold resistance, flexibility, oil resistance, etc. which are required for heat-shrinkable tubes for heat dissipation, and a heat-shrinkable tube manufactured therefrom.

BACKGROUND OF THE INVENTION

Heat-shrinkable tubes are tubes, the diameter or length of which shrink when cured after being heated, and have been widely used for packaging by air-tightly covering connection parts such as covered wire or conduit lines or by being inserted into a migration surface of a bottle or a battery.

A product or component to be covered or packaged is inserted into a hollow portion of such a heat-shrinkable tube and left at an appropriate temperature such that the heat-shrinkable tube shrinks to come into close contact with the product or component inside the hollow portion.

In particular, a heat-shrinkable tube for heat dissipation is inserted into a heat dissipation wire or harness or the like and then is used by heating it or causing to shrink at a certain temperature for a certain time. However, the heat-shrinkable tube is used in harsh environments, thus requiring excellent heat resistance and cold resistance, and is applied to an engine and the like, thus requiring high oil resistance.

Although not specified in the AMS-DTL-23053/1 and AMS-DTL-23053/16 standards, excellent flexibility is additionally required to facilitate insertion into a product or component in use to which heat-shrinkable tube for heat dissipation is applied, but it has not yet developed a tube product, for heat dissipation, which satisfies the existing heat dissipation standards and has excellent flexibility in use.

Existing heat-shrinkable tubes, for other purposes, requiring excellent flexibility are excellent in flexibility and thus easy to use but are not applicable as heat-shrinkable tubes for heat dissipation due to low tensile strength at room temperature and low tensile strength after oil-proof treatment.

Therefore, there is an urgent need for a composition, for a heat-shrinkable tube, having excellent mechanical properties, heat resistance, cold resistance, flexibility, oil resistance, and the like which are required for heat-shrinkable tubes for heat dissipation, and a heat-shrinkable tube manufactured therefrom.

BRIEF SUMMARY OF THE INVENTION

The present invention is directed to providing a composition, for a heat-shrinkable tube, having excellent heat resistance, cold resistance, flexibility, oil resistance, and the like, and a heat-shrinkable tube manufactured therefrom.

According to an aspect of the present invention, provided is a composition for a heat-shrinkable tube, comprising: a base resin; and a flame retardant, wherein the base resin comprises chlorinated polyolefin resin and polyolefin elastomer, wherein the chlorinated polyolefin resin comprises chlorine in an amount of 30 to 40% by weight based on the total weight thereof, and the polyolefin elastomer has a melting point of 95 to 120° C., and an amount of the chlorinated polyolefin resin is 40 to 60 parts by weight and an amount of the polyolefin elastomer is 20 to 40 parts by weight, based on 100 parts by weight of the base resin.

According to another aspect of the present invention, provided is the composition for a heat-shrinkable tube, wherein the chlorinated polyolefin resin has a Mooney viscosity (ML1+4, 121° C.) of 100 or more.

According to other aspect of the present invention, provided is the composition for a heat-shrinkable tube, wherein the polyolefin elastomer has a melt viscosity of 1 dg/min or less.

According to other aspect of the present invention, provided is the composition for a heat-shrinkable tube, wherein the base resin further comprises ethylene vinyl acetate (EVA).

According to other aspect of the present invention, provided is the composition for a heat-shrinkable tube, wherein the ethylene vinyl acetate (EVA) comprises vinyl acetate (VA) in an amount of 25 to 30% by weight based on the total weight thereof.

According to other aspect of the present invention, provided is the composition for a heat-shrinkable tube, wherein the chlorinated polyolefin resin comprises a chlorinated polyethylene resin.

According to other aspect of the present invention, provided is the composition for a heat-shrinkable tube, wherein the flame retardant comprises magnesium hydroxide (Mg(OH)$_2$), the surface of which is treated hydrophobically.

According to other aspect of the present invention, provided is the composition for a heat-shrinkable tube, wherein an amount of the flame retardant is 15 to 40 parts by weight, based on 100 parts by weight of the base resin.

According to other aspect of the present invention, provided is the composition for a heat-shrinkable tube, further comprising at least another additive selected from the group consisting of a flame retardant aid, an antioxidant, a cross-linking aid, a UV inhibitor, a processing aid, a heat stabilizer, a lubricant, an anti-blocking agent, an anti-static agent, wax, a coupling agent, and a pigment.

According to other aspect of the present invention, provided is the composition for a heat-shrinkable tube, wherein the flame retardant aid comprises an antimony-based flame retardant aid and a bromine-based flame retardant aid, wherein an amount of the antimony-based flame retardant aid and an amount of the bromine-based flame retardant aid are each 5 to 15 parts by weight, based on 100 parts by weight of the base resin.

According to other aspect of the present invention, provided is a heat-shrinkable tube manufactured from the composition for a heat-shrinkable tube.

In a composition for a heat-shrinkable tube and a heat-shrinkable tube manufactured therefrom according to the present invention, heat resistance, cold resistance, flexibility, oil resistance, and the like can be simultaneously improved through a combination of a specific base resin.

DETAILED DESCRIPTION OF THE INVENTION

Figure 1:
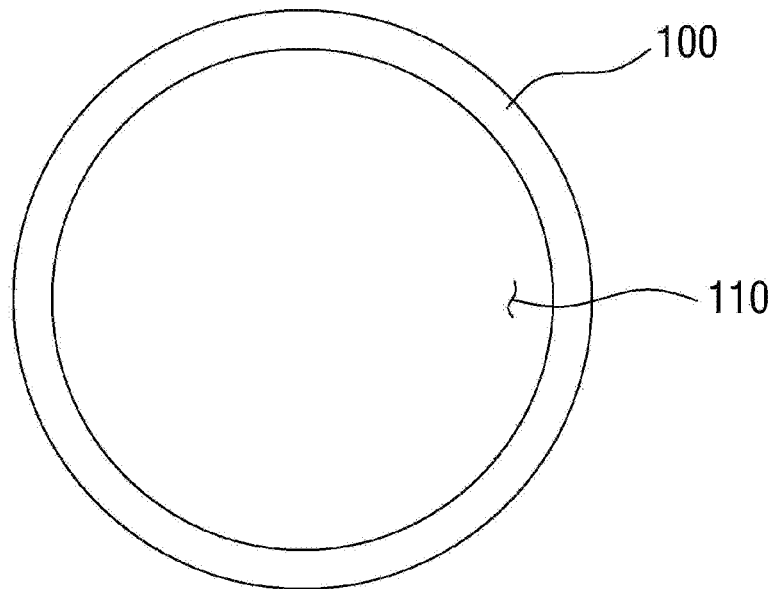
FIG. 1 is a schematic cross-sectional view of a heat-shrinkable tube according to an embodiment of the present invention.

Hereinafter, exemplary embodiments of the present invention will be described in detail. The present invention is, however, not limited thereto and may be embodied in many different forms. Rather, the embodiments set forth herein are provided so that this disclosure may be thorough and complete and fully convey the scope of the invention to those skilled in the art. Throughout the specification, the same reference numbers represent the same elements.

A composition for a heat-shrinkable tube according to the present invention includes a base resin and a flame retardant and may further include other additives according to a purpose.

The base resin may include chlorinated polyolefin resin (CPO) and polyolefin elastomer (POE). Here, the chlorinated polyolefin resin (CPO) may preferably include chlorinated polyethylene resin (CPE), and the amount of chlorine (Cl) may be 30 to 40% by weight based on the total weight of the chlorinated polyolefin resin (CPO).

When the amount of the chlorine (Cl) is less than 30% by weight, flame retardancy of the composition and the heat-shrinkable tube manufactured therefrom may be insufficient or an excessive amount of a flame retardant may be added to improve flame retardancy, thereby greatly reducing mechanical strength of the composition and the heat-shrinkable tube manufactured therefrom. On the other hand, when the amount of the chlorine (Cl) is greater than 40% by weight, the flame retardancy of the composition and the heat-shrinkable tube manufactured therefrom may be excellent but cold resistance, flexibility, etc. may greatly decrease.

The chlorinated polyolefin resin (CPO) may have a Mooney viscosity (ML1+4, 121° C.) of 100 or more, and preferably 100 to 150. When the Mooney viscosity (ML1+4, 121° C.) of the chlorinated polyolefin resin (CPO) is less than 100, oil resistance of the composition and the heat-shrinkable tube manufactured therefrom may significantly decrease. When the Mooney viscosity (ML1+4, 121° C.) is greater than 150, cold resistance, flexibility and the like may be insufficient.

The polyolefin elastomer (POE) may have a melting point (Tm) of 95° C. or higher and preferably 95 to 120° C., and a melt viscosity of 1 dg/min or lower and preferably 0.1 to 1 dg/min.

Here, when the melting point (Tm) of the polyolefin elastomer (POE) is less than 95° C., the heat resistance, oil resistance, etc. of the composition and the heat-shrinkable tube manufactured therefrom may significantly decrease, whereas when the melting point (Tm) is greater than 120° C., the cold resistance, flexibility, and the like of the composition and the heat-shrinkable tube manufactured therefrom may be insufficient.

When the melt viscosity of the polyolefin elastomer (POE) is greater than 1 dg/min, the mechanical strength, heat resistance, oil resistance, etc. of the composition and the heat-shrinkable tube manufactured therefrom may be insufficient.

In the present invention, the amount of the chlorinated polyolefin resin (CPO) may be 40 to 60 parts by weight and the amount of the polyolefin elastomer (POE) may be 20 to 40 parts by weight, based on 100 parts by weight of the base resin. Here, when the amount of the chlorinated polyolefin resin (CPO) is less than 40 parts by weight, the mechanical strength, oil resistance, cold resistance, flexibility, etc. of the composition and the heat-shrinkable tube manufactured therefrom may decrease, whereas when the amount of the chlorinated polyolefin resin (CPO) is greater than 60 parts by weight, the oil resistance of the composition and the heat-shrinkable tube manufactured therefrom may decrease. When the amount of the polyolefin elastomer (POE) is greater than 40 parts by weight, cold resistance, flexibility, and the like may significantly decrease.

The base resin may further include ethylene vinyl acetate (EVA). The ethylene vinyl acetate (EVA) may include vinyl acetate (VA) in an amount of 25 to 30% by weight based on the total weight thereof. Here, when the amount of the vinyl acetate (VA) is less than 25% by weight, compatibility between the base resin and additives including the flame retardant may decrease and the oil resistance and the like of the composition and the heat-shrinkable tube manufactured therefrom may decrease, whereas when the amount of the vinyl acetate (VA) is greater than 30% by weight, the mechanical strength and the like of the composition and the heat-shrinkable tube manufactured therefrom may decrease.

The amount of the ethylene vinyl acetate (EVA) may be 0 to 15 parts by weight based on 100 parts by weight of the base resin. When the amount of the ethylene vinyl acetate (EVA) is greater than 15 parts by weight, the mechanical strength, heat resistance, and the like of the composition and the heat-shrinkable tube manufactured therefrom may significantly decrease.

The flame retardant may additionally improves the flame retardancy of the composition and the heat-shrinkable tube manufactured therefrom, and include, for example, a metal hydroxide such as aluminum hydroxide ($Al(OH)_3$) and magnesium hydroxide ($Mg(OH)_2$), and preferably, magnesium hydroxide ($Mg(OH)_2$).

A surface of the metal hydroxide may be treated hydrophobically to improve compatibility with the base resin, and may be, for example, silane-coated with a surface treatment agent such as vinylsilane. The amount of the metal hydroxide may be 15 to 40 parts by weight, based on 100 parts by weight of the base resin. When the amount of the metal hydroxide is less than 15 parts by weight, the flame retardancy of the composition and the heat-shrinkable tube manufactured therefrom may significantly decrease, whereas when the amount of the metal hydroxide is greater than 40 parts by weight, mechanical strength and the like may decrease.

The other additives may further include a flame retardant aid, an antioxidant, a crosslinking aid, a UV inhibitor, a processing aid, a heat stabilizer, a lubricant, an anti-blocking agent, an anti-static agent, wax, a coupling agent, a pigment, and the like according to use of the heat-shrinkable tube manufactured from the composition for a heat-shrinkable tube according to the present invention.

Here, the flame retardant aid is an additive which suppresses a decrease of mechanical strength, heat resistance, oil resistance, cold resistance, flexibility, etc. through interaction with the flame retardant while additionally improving the flame retardancy of the composition and the heat-shrinkable tube manufactured therefrom. Examples of the flame retardant aid may include an antimony-based flame retardant aid, a bromine-based flame retardant aid, and the like. The amount of the antimony-based flame retardant aid and the amount of the bromine-based flame retardant aid may be each 5 to 15 parts by weight, based on 100 parts by weight of the base resin.

Examples of the antioxidant may include a phenolic antioxidant, a phenolic copper anti-oxidant, a sulfur-based antioxidant, and the like. The amount of the phenolic antioxidant may be 1 to 5 parts by weight, the amount of the phenolic copper antioxidant may be 0.5 to 3 parts by weight, and the amount of the sulfur-based antioxidant may be 0.5 to 3 parts by weight, based on 100 parts by weight of the base resin.

When the amount of the antioxidant is less than a reference value, an effect of the antioxidant is negligible, whereas when the amount of the antioxidant is greater than the reference value, an irradiation crosslinking reaction may be inhibited due to loss of radicals required for crosslinking by irradiation crosslinking.

The crosslinking aid is a crosslinking aid for irradiation crosslinking and may include trimethylolpropane trimethacrylate, triaryl isocyanurate or the like. The amount of the crosslinking aid may be 2 to 5 parts by weight, based on 100 parts by weight of the base resin. Here, when the amount of the crosslinking aid is less than 2 parts by weight, a degree of crosslinking may be insufficient and thus the mechanical strength and insertion workability of the heat-shrinkable tube may significantly decrease, whereas when the amount of the crosslinking aid is greater than 5 parts by weight, an initial crosslinking reaction rate may increase rapidly and thus the degree of crosslinking may increase, thereby preventing performance of an expansion process which is part of a manufacturing process of a heat-shrinkable tube.

In addition, the amount of the lubricant such as polyethylene-based wax or zinc stearate may be 0.5 to 5 parts by weight, based on 100 parts by weight of the base resin.

Figure 2:
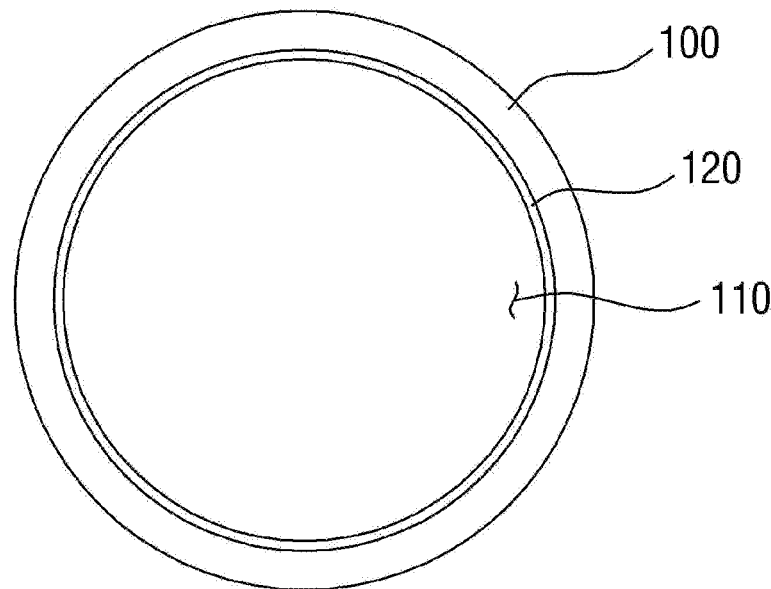
FIG. 2 is a schematic cross-sectional view of a heat-shrinkable tube according to another embodiment of the present invention.

FIG. 1 is a schematic cross-sectional view of a heat-shrinkable tube according to an embodiment of the present invention. FIG. 2 is a schematic cross-sectional view of a heat-shrinkable tube according to another embodiment of the present invention.

A heat-shrinkable tube 100 according to the present invention may have a cylindrical structure having a hollow portion 110 into which a products or component to be covered or packaged is inserted and placed, and a thickness, an inner diameter, an outer diameter, etc. thereof may vary according to use and an environment of the heat-shrinkable tube 100. Alternatively, as illustrated in FIG. 2, a heat-shrinkable tube 100 may have a structure in which an adhesive coating layer 120 is provided on an inner wall thereof.

EXAMPLES

1. Preparation Example

Samples of a composition for a heat-shrinkable tube and a heat-shrinkable tube were prepared with components and in amounts shown in Table 1 below. Units of the amounts shown in Table 1 below are wt %.

TABLE 1

|  | Example | | | Comparative example | | | | | | |
| --- | --- | --- | --- | --- | --- | --- | --- | --- | --- | --- |
|  | 1 | 2 | 3 | 1 | 2 | 3 | 4 | 5 | 6 | 7 |
| resin 1 | 50 | 60 | 45 |  | 60 | 50 | 30 | 70 | 60 | 50 |
| resin 2 |  |  |  | 60 |  |  |  |  |  |  |
| resin 3 | 35 | 40 | 40 | 40 |  | 35 | 40 | 30 | 35 | 50 |
| resin 4 |  |  |  |  | 40 |  |  |  |  |  |
| resin 5 | 15 |  | 15 |  |  |  |  | 30 |  |  |
| resin 6 |  |  |  |  |  | 15 |  |  |  |  |
| resin 7 |  |  |  |  |  |  |  |  | 5 |  |
| flame retardant and other additives | 60 | 60 | 60 | 60 | 60 | 60 | 60 | 60 | 60 | 60 | resin 1: chlorinated polyethylene resin (chlorine content: 35 wt %, Mooney viscosity (ML1 + 4, 121° C.): 100)
resin 2: chlorinated polyethylene resin (chlorine content: 35 wt %, Mooney viscosity (ML1 + 4, 121° C.): 70)
resin 3: polyolefin elastomer (melting point: 99° C., melting viscosity: 1 dg/min)
resin 4: polyolefin elastomer (melting point: 73° C., melting viscosity: 1.2 dg/min)
resin 5: ethylene vinyl acetate (vinyl acetate content: 28% by weight)
resin 6: ethylene vinyl acetate (vinyl acetate content: 19% by weight)
resin 7: ethylene vinyl acetate grated with maleic anhydride 2. Evaluation of Physical Properties 1) Evaluation of Physical Properties at Room Temperature Tensile strength and elongation of each of heat-shrinkable tubes of Examples and Comparative examples were measured according to the specifications of a heat-shrinkable tube for heat dissipation according to the AMS-DTL-23053-1 & 16 standards. Tensile strength should be 1.19 kgf/mm$^2$ or more and elongation should be 250% or more.

2) Evaluation of Oil Resistance

Tensile strength and elongation of each of the heat-shrinkable tubes of Examples and Comparative Examples were measured after being immersed in oil (MIL-5624/25° C./24 hr). Tensile strength should be 1.05 kgf/mm$^2$ or more and elongation should be 250% or more.

3) Evaluation of Flexibility (Tensile Strength @5% Strain)

When physical properties are evaluated at room temperature, tensile strength should be 0.15 to 0.4 kgf/mm$^2$ when elongation is 5%.

A result of the evaluation of the physical properties is as shown in Table 2 below.

TABLE 2

|  | Example | | | Comparative example | | | | | | |
| --- | --- | --- | --- | --- | --- | --- | --- | --- | --- | --- |
|  | 1 | 2 | 3 | 1 | 2 | 3 | 4 | 5 | 6 | 7 |
| tensile strength (kgf/mm$^2$) | 1.648 | 1.727 | 1.624 | 1.627 | 1.674 | 1.657 | 1.806 | 1.670 | 1.791 | 2.011 |
| elongation (%) | 599 | 596 | 608 | 604 | 630 | 604 | 507 | 602 | 601 | 456 |
| oil-resistant tensile strength (kgf/mm$^2$) | 1.194 | 1.246 | 1.145 | 0.971 | 1.024 | 0.997 | 0.956 | 1.045 | 1.254 | 1.312 |

TABLE 2-continued

| | Example | | | Comparative example | | | | | | |
|---|---|---|---|---|---|---|---|---|---|---|
| | 1 | 2 | 3 | 1 | 2 | 3 | 4 | 5 | 6 | 7 |
| oil-resistant elongation (%) | 551 | 546 | 554 | 523 | 586 | 541 | 427 | 577 | 584 | 417 |
| tensile strength@5% strain (kgf/mm$^2$) | 0.257 | 0.277 | 0.219 | 0.220 | 0.264 | 0.269 | 0.416 | 0.298 | 0.437 | 0.554 |

As shown in Table 2 above, the heat-shrinkable tubes of Examples 1 to 3 of the present invention were excellent in mechanical strength, oil resistance, flexibility, cold resistance, and the like. In contrast, in the case of the heat-shrinkable tubes of Comparative Examples 1 and 2, a Mooney viscosity of chlorinated polyolefin resin was below a reference value, a melting point of polyolefin elastomer was below a reference value, or vinyl acetate content of ethylene vinyl acetate was below a reference value and thus oil resistance significantly decreased. In the case of the heat shrinkable tube of Comparative example 4, the amount of chlorinated polyolefin resin was below a reference value and the amount of ethylene vinyl acetate was above a reference value and thus oil resistance, cold resistance, flexibility, and the like significantly decreased. In the case of the heat shrinkable tube of Comparative example 5, the amount of chlorinated polyolefin resin was excessive and thus oil resistance significantly decreased. In the case of the heat shrinkable tubes of Comparative examples 6 and 7, ethylene vinyl acetate grafted with maleic anhydride was applied instead of ethylene vinyl acetate or the amount of polyolefin elastomer was excessive and thus cold resistance, flexibility, and the like significantly decreased.

While the present invention has been described above with respect to exemplary embodiments thereof, it would be understood by those of ordinary skilled in the art that various changes and modifications may be made without departing from the technical conception and scope of the present invention defined in the following claims. Thus, it is clear that all modifications are included in the technical scope of the present invention as long as they include the components as claimed in the claims of the present invention.

The invention claimed is:

1. A composition for a heat-shrinkable tube, comprising:
a base resin; and
a flame retardant,
wherein the base resin comprises chlorinated polyolefin resin and polyolefin elastomer,
wherein the chlorinated polyolefin resin comprises chlorine in an amount of 30 to 40% by weight based on the total weight thereof and has a Mooney viscosity (ML1+4, 121° C.) of 100 or more, and the polyolefin elastomer has a melting point of 95 to 120° C. and a melt viscosity of 1 dg/min or less, and
an amount of the chlorinated polyolefin resin is 40 to 60 parts by weight and an amount of the polyolefin elastomer is 20 to 40 parts by weight, based on 100 parts by weight of the base resin.

2. The composition for a heat-shrinkable tube of claim 1, wherein the base resin further comprises ethylene vinyl acetate (EVA).

3. The composition for a heat-shrinkable tube of claim 2, wherein the ethylene vinyl acetate (EVA) comprises vinyl acetate (VA) in an amount of 25 to 30% by weight based on the total weight thereof.

4. The composition for a heat-shrinkable tube of claim 1, wherein the chlorinated polyolefin resin comprises a chlorinated polyethylene resin.

5. The composition for a heat-shrinkable tube of claim 1, wherein the flame retardant comprises magnesium hydroxide (Mg(OH)$_2$), the surface of which is treated hydrophobically.

6. The composition for a heat-shrinkable tube of claim 5, wherein an amount of the flame retardant is 15 to 40 parts by weight, based on 100 parts by weight of the base resin.

7. The composition for a heat-shrinkable tube of claim 1, further comprising at least another additive selected from the group consisting of a flame retardant aid, an antioxidant, a crosslinking aid, a UV inhibitor, a processing aid, a heat stabilizer, a lubricant, an anti-blocking agent, an anti-static agent, wax, a coupling agent, and a pigment.

8. The composition for a heat-shrinkable tube of claim 7, wherein the flame retardant aid comprises an antimony-based flame retardant aid and a bromine-based flame retardant aid,
wherein an amount of the antimony-based flame retardant aid and an amount of the bromine-based flame retardant aid are each 5 to 15 parts by weight, based on 100 parts by weight of the base resin.

9. A heat-shrinkable tube manufactured from the composition for a heat-shrinkable tube according to claim 1.

* * * * *